(12) United States Patent
Ji et al.

(10) Patent No.: US 9,966,023 B1
(45) Date of Patent: May 8, 2018

(54) LIQUID CRYSTAL DISPLAY DEVICE AND CONTROL METHOD FOR THE SAME

(71) Applicant: Shenzhen China Star Optoelectronics Technology Co., Ltd., Shenzhen, Guangdong (CN)

(72) Inventors: Feilin Ji, Guangdong (CN); Jiehui Qin, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days. days.

(21) Appl. No.: 15/853,724

(22) Filed: Dec. 23, 2017

Related U.S. Application Data

(62) Division of application No. 14/776,858, filed on Sep. 15, 2015, now Pat. No. 9,886,917.

(51) Int. Cl.
*G09G 3/36* (2006.01)

(52) U.S. Cl.
CPC ......... *G09G 3/3607* (2013.01); *G09G 3/3677* (2013.01); *G09G 2300/0452* (2013.01)

(58) Field of Classification Search
CPC ............... G09G 3/3607; G09G 3/3677; G09G 2300/0452
See application file for complete search history.

(56) References Cited

U.S. PATENT DOCUMENTS

2013/0063912 A1* 3/2013 Liao ........................ B65D 73/02
361/760

\* cited by examiner

*Primary Examiner* — Sejoon Ahn
(74) *Attorney, Agent, or Firm* — Andrew C. Cheng

(57) ABSTRACT

An LCD device includes: multiple data lines, scanning lines, pixel units and switching elements. First terminals of the switching elements are connected together for receiving a control signal. Second terminals of the switching elements are connected together for receiving a reference voltage signal. Third terminal of each switching element is connected to a corresponding data line. When the control signal is a first control signal, each switching element is turned off, grayscale voltage signals are applied on corresponding pixel units, and a normal image frame is displayed. When the control signal is a second control signal, each switching element is turned on, the reference voltage signal is applied on the pixel units, an inserted black frame is displayed. A simple and power-saving way for an inserted black frame is realized to solve the cross talk in 3D display or a serious image smear problem in low refresh rate.

8 Claims, 3 Drawing Sheets

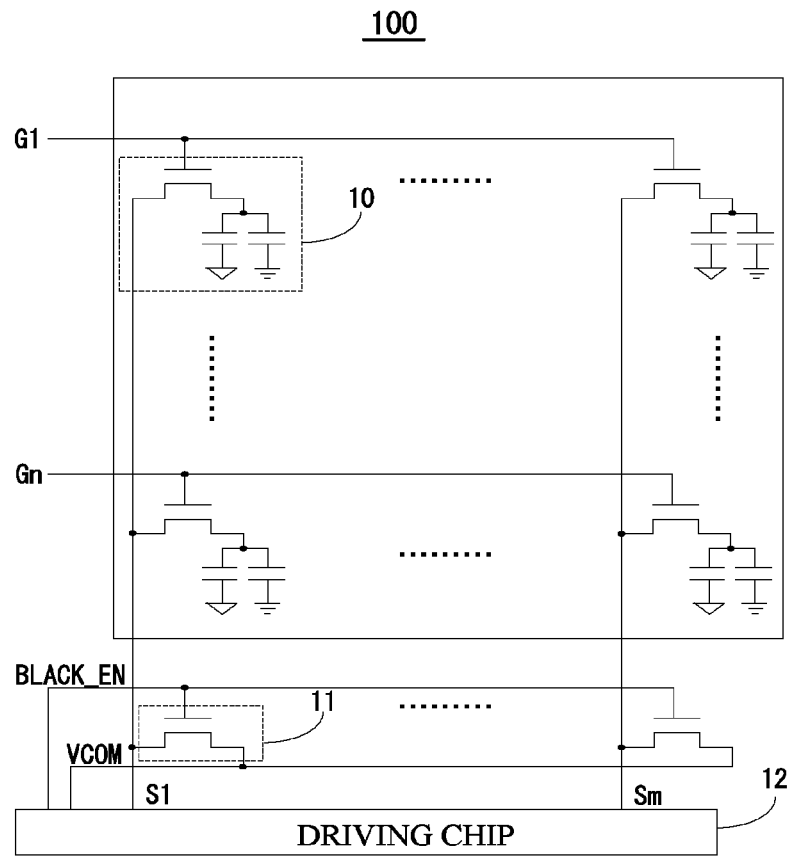

FIG. 1

| CONTROLLING SWITCHING ELEMENTS TO BE TURNED OFF BY A FIRST CONTROL SIGNAL SUCH THAT GRAYSCALE VOLTAGE SIGNALS ARE APPLIED ON CORRESPONDING PIXEL UNITS THROUGH DATA LINES, AND A LIQUID CRYSTAL DISPLAY DEVICE DISPLAYS A NORMAL IMAGE FRAME | S101 |
|---|---|

↓

| CONTROLLING THE SWITCHING ELEMENTS TO BE TURNED ON BY A SECOND CONTROL SIGNAL SUCH THAT A REFERENCE VOLTAGE SIGNAL IS APPLIED ON CORRESPONDING PIXEL UNITS THROUGH DATA LINES, AND THE LIQUID CRYSTAL DISPLAY DEVICE DISPLAYS AN INSERTED BLACK FRAME | S102 |
|---|---|

FIG. 2

LIQUID CRYSTAL DISPLAY DEVICE AND CONTROL METHOD FOR THE SAME

CROSS REFERENCE TO RELATED APPLICATIONS

This is a divisional application of co-pending patent application Ser. No. 14/776,858, filed on Sep. 15, 2015, which is a national stage of PCT application number PCT/CN2015/086740, filed on Aug. 12, 2015, claiming foreign priority of Chinese patent application number 201510472667.6, filed on Aug. 4, 2015.

BACKGROUND OF THE INVENTION

1. Field of the Invention

The present invention relates to the liquid crystal display technology field, and more particularly to a liquid crystal display device and a control method for the same.

2. Description of Related Art

Currently, in a 3D display technology, a black insertion technology is utilized to reduce a cross talk phenomenon when left and right eyes are viewing images. Specifically, through inserting a black picture between two picture frames in order to cover a gray residual image of a picture in order to reduce the cross talk phenomenon. Besides, the black insertion technology can also solve a serious smear problem of a liquid crystal display under a low refresh rate. Specifically, through inserting a black picture between two frame pictures in order to increase a refresh rate in order to reduce the image smear phenomenon.

The traditional black insertion technology utilizes a timing controller (TCON) to output black picture data in order to insert a black picture so that the traditional black insertion technology is complex to realize and consumes a certain amount of power.

SUMMARY OF THE INVENTION

The main technology problem solved by the present invention is to provide a liquid crystal display device and a control method for the same, which is capable of realizing an inserted black frame by a simple and power-saving way in order to solve the cross talk in 3D display or a serious image smear problem in low refresh rate.

In order to solve above technology problems, a technology solution adopted by the present invention is: a liquid crystal display device comprising: multiple data lines; multiple scanning line; multiple pixel units, wherein each pixel unit is connected to a corresponding data line and a corresponding scanning line; and multiple switching elements, wherein each switching element has a first terminal, a second terminal and a third terminal; the first terminals of the switching elements are connected with each other for receiving a control signal; the second terminals of the switching elements are connected with each other for receiving a reference voltage signal; the third terminal of each switching element is connected to a corresponding data line; wherein when the control signal is a first control signal, each of the switching elements is turned off such that grayscale voltage signals are respectively applied on corresponding pixel units through the multiple data lines, and the liquid crystal display device displays a normal image frame; when the control signal is a second control signal, each of the switching elements is turned on, the reference voltage signal is applied on the multiple pixel units through the multiple data lines, and the liquid crystal display device displays a inserted black frame; wherein each switching element is a N-type Metal Oxide Semiconductor (MOS) transistor; the first terminal, the second terminal and the third terminal of each switching element are respectively a gate, a drain and a source of the N-type MOS transistor; and wherein the reference voltage signal is a common voltage signal applied on a common electrode of the liquid crystal display device.

In the above, each pixel unit includes a red subpixel, a green subpixel and a blue subpixel; each scanning line includes a red scanning line, a green scanning line and a blue scanning line; the red subpixel, the green subpixel and the blue subpixel are respectively connected with corresponding red scanning line, green scanning line and blue scanning line; the red subpixel, the green subpixel and the blue subpixel are connected with a same data line; and wherein when the control signal is a first control signal, scanning signals on the red scanning lines, the green scanning lines and the blue scanning lines are enabled in a time division manner such that grayscale voltage signals are applied on corresponding red subpixels, green subpixels and blue subpixels through data lines in a time division manner; when the control signal is a second control signal, scanning signals on the red scanning lines, the green scanning lines and the blue scanning lines are enabled simultaneously such that the reference voltage signal is simultaneously applied on the red subpixels, the green subpixels and the blue subpixels through the data lines.

In the above, the first control signal is a low-voltage signal, the second control signal is a high-voltage signal, and the first control signal and the second control signal are appeared alternately.

In the above, the liquid crystal display device further includes a driving chip, the first terminal and the second terminal of each switching element are connected with the driving chip, the first terminal of each switching element is used for receiving the control signal outputted from the driving chip, and the second terminal of each switching element is used for receiving the reference voltage signal outputted from the driving chip.

In the above, the liquid crystal display device further includes a timing controller, a printed circuit board and a flip-chip thin film; the first terminal of each switching element is connected with the timing controller through the flip-chip thin film and the printed circuit board for receiving the control signal outputted from the timing controller; the second terminal of each switching element is connected with the reference voltage signal in the flip-chip thin film.

In order to solve above technology problems, another technology solution adopted by the present invention is: a liquid crystal display device comprising: multiple data lines; multiple scanning line; multiple pixel units, wherein each pixel unit is connected to a corresponding data line and a corresponding scanning line; and multiple switching elements, wherein each switching element has a first terminal, a second terminal and a third terminal; the first terminals of the switching elements are connected with each other for receiving a control signal; the second terminals of the switching elements are connected with each other for receiving a reference voltage signal; the third terminal of each switching element is connected to a corresponding data line; wherein when the control signal is a first control signal, each of the switching elements is turned off such that grayscale voltage signals are respectively applied on corresponding pixel units through the multiple data lines, and the liquid crystal display device displays a normal image frame; when the control signal is a second control signal, each of the switching elements is turned on, the reference voltage signal is applied on the multiple pixel units through the multiple data lines, and the liquid crystal display device displays an inserted black frame.

In the above, each pixel unit includes a red subpixel, a green subpixel and a blue subpixel; each scanning line includes a red scanning line, a green scanning line and a blue scanning line; the red subpixel, the green subpixel and the blue subpixel are respectively connected with corresponding red scanning line, green scanning line and blue scanning line; the red subpixel, the green subpixel and the blue subpixel are connected with a same data line; wherein when the control signal is a first control signal, scanning signals on the red scanning lines, the green scanning lines and the blue scanning lines are enabled in a time division manner such that grayscale voltage signals are applied on corresponding red subpixels, green subpixels and blue subpixels through data lines in a time division manner; when the control signal is a second control signal, scanning signals on the red scanning lines, the green scanning lines and the blue scanning lines are enabled simultaneously such that the reference voltage signal is simultaneously applied on the red subpixels, the green subpixels and the blue subpixels through the data lines.

In the above, each switching element is a N-type Metal Oxide Semiconductor (MOS) transistor; the first terminal, the second terminal and the third terminal of each switching element are respectively a gate, a drain and a source of the N-type MOS transistor.

In the above, the first control signal is a low-voltage signal, the second control signal is a high-voltage signal, and the first control signal and the second control signal are appeared alternately.

In the above, the liquid crystal display device further includes a driving chip, the first terminal and the second terminal of each switching element are connected with the driving chip, the first terminal of each switching element is used for receiving the control signal outputted from the driving chip, and the second terminal of each switching element is used for receiving the reference voltage signal outputted from the driving chip.

In the above, the liquid crystal display device further includes a timing controller, a printed circuit board and a flip-chip thin film; the first terminal of each switching element is connected with the timing controller through the flip-chip thin film and the printed circuit board for receiving the control signal outputted from the timing controller; the second terminal of each switching element is connected with the reference voltage signal in the flip-chip thin film.

In the above, the reference voltage signal is a common voltage signal applied on a common electrode of the liquid crystal display device.

In order to solve above technology problems, another technology solution adopted by the present invention is: a control method for a liquid crystal display device, comprising: controlling switching elements to be turned off by a first control signal such that grayscale voltage signals are applied on corresponding pixel units through data lines, and a liquid crystal display device displays a normal image frame; and controlling the switching elements to be turned on by a second control signal such that a reference voltage signal is applied on pixel units through data lines, and the liquid crystal display device displays an inserted black frame.

In the above, each pixel unit includes a red subpixel, a green subpixel and a blue subpixel, and the control method further comprises: controlling the grayscale voltage signals by scanning signals to be applied on corresponding red subpixels, green subpixels and blue subpixels through the data lines by a time division manner; and controlling the reference voltage signal to be simultaneously applied on corresponding red subpixels, green subpixels and blue subpixels through data lines by the scanning signals.

In the above, polarities of grayscale voltage signals of adjacent normal image frames are opposite.

Beneficial effects of the present invention are: in the liquid crystal display device and the control for the same, through controlling the switching elements to be turned off, grayscale voltage signals are applied on corresponding pixel units through data lines such that the liquid crystal display device displays a normal image frame. Through controlling the switching elements to be turned on, the reference voltage is applied on corresponding pixel units through data lines such that the liquid crystal display device displays the inserted black frame. Accordingly, a simple and power-saving way for an inserted black frame is realized to solve the cross talk in 3D display or a serious image smear problem in low refresh rate.

BRIEF DESCRIPTION OF THE DRAWINGS

FIG. 1 is a schematic diagram of a liquid crystal display device according to a first embodiment of the present invention;

FIG. 2 is a flow chart of a control method for the liquid crystal display shown in FIG. 1;

DETAILED DESCRIPTION OF THE PREFERRED EMBODIMENT

Figure 3:
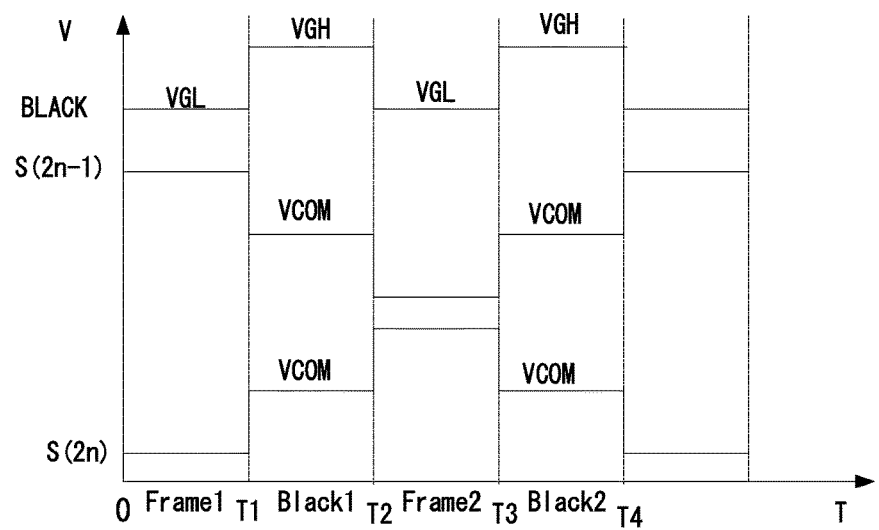
FIG. 3 is signal timing diagram of the control method for the liquid crystal display device shown in FIG. 2.

In the embodiment and claims of the present invention, some vocabularies are used to indicate some specific elements. A person skilled in the art can understand that manufacturers may use a different vocabulary to indicate a same element. The present embodiment and claims do not use the difference in the vocabularies to distinguish the elements. The present embodiment and claims utilize the difference in the functions of the elements to distinguish the elements. The following content combines with the drawings and the embodiment for describing the present invention in detail.

FIG. 1 is a schematic diagram of a liquid crystal display device according to a first embodiment of the present invention. With reference to FIG. 1, the liquid crystal display device 100 includes: multiple data lines S1, . . . , Sm (wherein m is a natural number), multiple scanning lines G1, . . . , Gn (wherein n is a natural number), multiple pixel units 10, multiple switching elements 11 and a driving chip 12.

Each pixel unit 10 is connected to a corresponding data line and a corresponding scanning line. The data lines S1, . . . , Sm are connected with the driving chip 12. Each switching element 11 has a first terminal, a second terminal and a third terminal. After the first terminals of the switching elements 11 are connected with each other, the first terminals are connected with the driving chip 12 for receiving a control signal BLACK_EN outputted from the driving chip 12. After the second terminals of the switching elements 11 are connected with each other, the second terminals are connected with the driving chip 12 for receiving a reference voltage signal VCOM outputted from the driving chip 12. A third terminal of each switching element 11 is connected with a corresponding data line. The switching elements 11 are disposed in a non-display area of the liquid crystal display device 100.

When the control signal BLACK_EN is a first control signal, each of the switching elements is turned off; grayscale voltage signals outputted from the driving chip 12 are respectively applied on corresponding pixel units 10 through the data lines S1, . . . , Sm; and the liquid crystal display device 100 displays a normal image frame. When the control signal BLACK_EN is a second control signal, each of the switching elements is turned on; the reference voltage signal outputted from the driving chip 12 is applied on the pixel units 10 through data lines S1, . . . , Sm; and the liquid crystal display device 100 displays an inserted black frame.

Specifically, each switching element 11 is an N-type metal oxide semiconductor (MOS) transistor. The first terminal, the second terminal and the third terminal of the switching element 11 are respectively a gate, a drain and a source of the N-type MOS transistor. The first control signal is a low-voltage signal. The second control signal is a high-voltage signal. The first control signal and the second control signal are appeared alternately.

When the first control signal (that is, the low-voltage signal) is applied on the gate of the N-type MOS transistor, the drain and the source of the N-type MOS transistor are cut off (turned off) and the driving chip 12 outputs the grayscale voltage signals to the data lines S1, . . . , Sm such that the liquid crystal display device 100 displays a normal image frame. When the second control signal (that is, the high-voltage signal) is applied on the gate of the N-type MOS transistor, the drain and the source of the N-type MOS transistor are conductive (turned on), and the driving chip 12 outputs the reference voltage signal VCOM to the source of the N-type MOS transistor and stop outputting grayscale voltage signals to the data lines S1, . . . , Sm at the same time. At this time, pins of the driving chip 12 connected with the data lines S1, . . . , Sm are under a high impedance state. The reference voltage signal VCOM is applied on each pixel unit 10 through drains and sources of the N-type MOS transistor, and data lines S1, . . . , Sm such that the liquid crystal display device 100 displays an inserted black frame.

The first control signal and the second control signal are appeared alternately such that the normal image frame and the inserted black frame are displayed alternately so that the cross talk problem in a 3D display or a serious image smear problem because of low refresh rate can be solved.

In the present embodiment, the reference voltage signal VCOM is a signal outputted from the driving chip 12. In another embodiment, the reference voltage signal VCOM can also be a common voltage signal applied on a common electrode (not shown) of the liquid crystal display device 100.

FIG. 2 is a flow chart of a control method for the liquid crystal display device shown in FIG. 1, and as shown in FIG. 2, the method includes the following steps:

Step S101: controlling switching elements to be turned off by a first control signal such that grayscale voltage signals are applied on corresponding pixel units through data lines, and a liquid crystal display device displays a normal image frame.

In Step S101, when each switching element is an N-type MOS transistor, the first control signal is a low-voltage signal. The first control signal is applied on a first terminal of each switching element (that is, a gate of each N-type MOS transistor) such that a second terminal and a third terminal of each switching element (that is, a source and a drain of each N-type MOS transistor) are cut off. Grayscale voltage signals outputted from the driving chip are applied on corresponding pixel units through data lines, and the liquid crystal display device displays a normal image frame.

A person skilled in the art can understand that in another embodiment, the switching element can be another switching element different from the N-type MOS transistor such as a NPN triode. As long as under the control of the control signal, the cutoff and conductive function can be realized.

Step S102: controlling the switching elements to be turned on by a second control signal such that a reference voltage signal is applied on corresponding pixel units through data lines, and the liquid crystal display device displays an inserted black frame.

In Step S102, the second control signal is a high-voltage signal. The second control signal is applied on the first terminal of each switching element (that is, the gate of each N-type MOS transistor) such that the second terminal and the third terminal of each switching element are conductive. That is, the source and the drain of each N-type MOS transistor are conductive. The reference voltage signal is applied on corresponding pixel units through data lines, and the liquid crystal display device displays an inserted black frame.

Step S101 and Step S102 are operated repeatedly such that the liquid crystal display device 100 alternately displays a normal image frame and an inserted black frame.

With also reference to FIG. 3, FIG. 3 is signal timing diagram of the control method for the liquid crystal display device shown in FIG. 2. As shown in FIG. 3, a T-axis represents a time axis, and a V-axis represents a voltage axis, wherein 0 to T1 is a time interval for displaying a first image frame (Frame1), T1 to T2 is a time interval for displaying a first inserted image frame (Black1), T2 to T3 is a time interval for displaying a second image frame (Frame2), and T3 to T4 is a time interval for displaying a second inserted image frame (Black2).

BLACK represents a timing of a control signal applied on a first terminal of each switching element (that is, a gate of each N-type MOS transistor). S(2n−1) represents a timing of a signal applied on a (2n−1)-th data line. S(2n) represents a timing of a signal applied on a (2n)-th data line.

In a time interval of 0 to T1, a first control signal applied on BLACK is a low-voltage signal VGL. S(2n−1) and S(2n) are applied with grayscale voltage signals, wherein polarities of the grayscale voltage signals applied on S(2n−1) and S(2n) are opposite. The liquid crystal display device 100 displays a first image frame.

In a time interval of T1 to T2, a second control signal applied on BLACK is a high-voltage signal VGH. S(2n−1) and S(2n) are applied with a reference voltage signal VCOM. The liquid crystal display device 100 displays a first inserted black frame.

In a time interval of T2 to T3, a first control signal applied on BLACK is a low-voltage signal VGL. S(2n−1) and S(2n) are applied with grayscale voltage signals, wherein polarities of the grayscale voltage signals applied on S(2n−1) and S(2n) are opposite. The liquid crystal display device 100 displays a second image frame. Besides, on S(2n-1) or S(2n), a polarity of a grayscale voltage signal corresponding to the second image frame and a polarity of a grayscale voltage signal corresponding to the first image frame are opposite.

In a time interval of T3 to T4, a second control signal applied on BLACK is a high voltage signal VGH. S(2n-1) and S(2n) are applied with the reference voltage signal VCOM. The liquid crystal display device 100 displays a second inserted black frame.

Subsequent timings on BLACK, S(2n-1) and S(2n) are appeared repeatedly according to timings in the time interval 0 to T4 so that a normal image frame and an inserted black frame are alternately displayed on the liquid crystal display device 100.

The liquid crystal display device 100 in the above embodiment is a small size liquid crystal display device that is applied at a small size cell phone or a portable android device (PAD). When the liquid crystal display device 100 is a large size liquid crystal display device that applied at large size TV or monitor, the liquid crystal display device includes a timing controller (TCON), a printed circuit board (PCB) and a flip-chip thin film (COF). The first terminal of each switching element 11 is connected with the timing controller through the flip-chip thin film and the printed circuit board for receiving the control signal BLACK_EN outputted from the timing controller. The second terminal of each switching element 11 is connected with a reference voltage signal VCOM in the flip-chip thin film. Preferably, the reference voltage signal in the flip-chip thin film is a common voltage signal applied on the common electrode of the liquid crystal display device.

Figure 4:
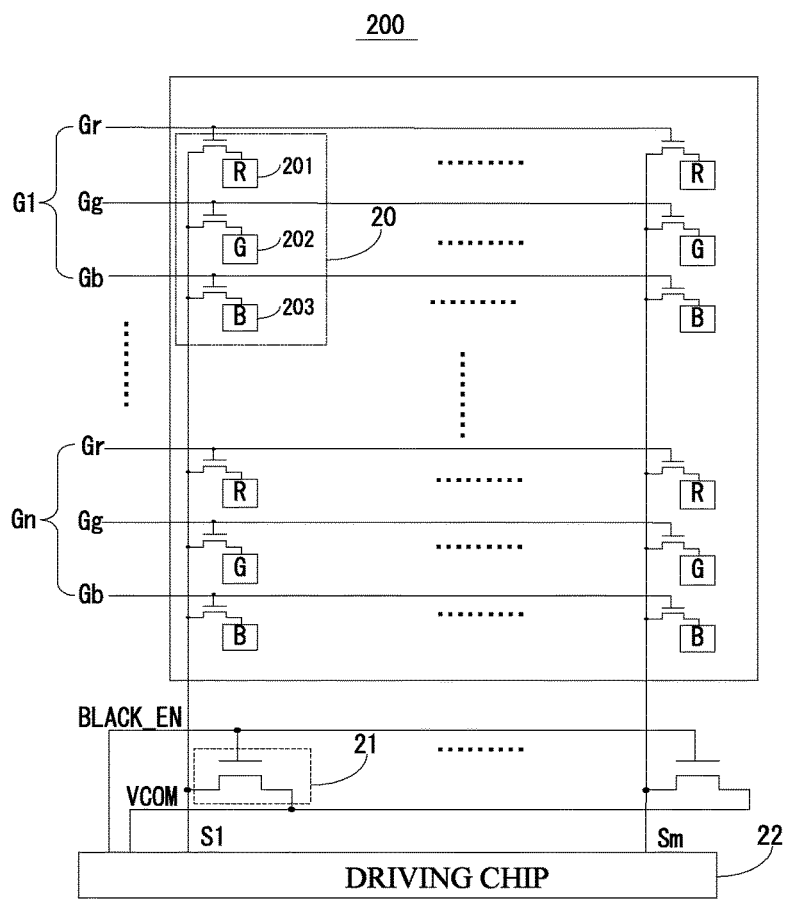
FIG. 4 is a schematic diagram of a liquid crystal display device according to a second embodiment of the present invention.

FIG. 4 is a schematic diagram of a liquid crystal display device according to a second embodiment of the present invention. As shown in FIG. 4, the liquid crystal display device 200 includes: multiple data lines S1, . . . , Sm (wherein m is a natural number), multiple scanning lines G1, . . . , Gn (wherein n is a natural number), multiple pixel units 20, multiple switching elements 20 and a driving chip 22.

Each pixel unit 20 includes a red subpixel 201, a green subpixel 202 and a blue subpixel 203. Each scanning line G includes a red scanning line Gr, a green scanning line Gg and a blue scanning line Gb. The red subpixels 201, the green subpixels 202 and the blue subpixels 203 are respectively connected with the corresponding red scanning lines Gr, green scanning lines Gg and blue scanning lines Gb. The red subpixel 201, the green subpixels 202 and the blue subpixels 203 are connected with a same data line.

The data lines S1, . . . , Sm are connected with the driving chip 22. Each switching element 21 has a first terminal, a second terminal and a third terminal. After the first terminals of the switching elements 21 are connected with each other, the first terminals are connected with the driving chip 22 for receiving a control signal BLACK_EN outputted from the driving chip 22. After the second terminals of the switching elements 21 are connected with each other, the second terminals are connected with the driving chip 22 for receiving a reference voltage signal VCOM outputted from the driving chip 22. A third terminal of each switching element 21 is connected with a corresponding data line, wherein the switching elements 21 are disposed in a non-display area of the liquid crystal display device 200.

When the control signal BLACK_EN is a first control signal, scanning signals on the red scanning lines Gr, the green scanning lines Gg and the blue scanning lines Gb are enabled in a time division manner such that grayscale voltage signals are applied on corresponding red subpixels 201, green subpixels 202 and blue subpixels 203 through data lines S1, . . . , Sm in a time division manner, and the liquid crystal display device 200 displays a normal image frame. When the control signal BLACK_EN is a second control signal, scanning signals on the red scanning lines Gr, the green scanning lines Gg and the blue scanning lines Gb are enabled simultaneously such that the reference voltage signal is applied on corresponding red subpixels 201, green subpixels 202 and blue subpixels 203 through data lines S1, . . . , Sm simultaneously, and the liquid crystal display device 200 displays an inserted black frame.

Specifically, each switching element 21 is an N-type metal oxide semiconductor (MOS) transistor. The first terminal, the second terminal and the third terminal of the switching element 21 are respectively a gate, a drain and a source of the N-type MOS transistor. The first control signal is a low-voltage signal. The second control signal is a high-voltage signal. The first control signal and the second control signal are appeared alternately.

When the first control signal (that is the low-voltage signal) is applied on the gate of the N-type MOS transistor, the drain and the source of the N-type MOS transistor are cut off (turned off), and the scanning signals on the red scanning lines Gr, the green scanning lines Gg and the blue scanning lines Gb are enabled in a time division manner such that grayscale voltage signals outputted from the driving chip 22 are applied on corresponding red subpixels 201, green subpixels 202 and blue subpixels 203 through data lines S1, . . . , Sm in a time division manner, and the liquid crystal display a normal image frame.

When the second control signal (that is the high-voltage signal) is applied on the gate of the N-type MOS transistor, the drain and the source of the N-type MOS transistor are conductive (turned on), and the driving chip 22 outputs the reference voltage signal VCOM to the sources of the N-type MOS transistors and stop outputting grayscale voltage signals to the data lines S1, . . . , Sm at the same time. At this time, the scanning signals on the red scanning lines Gr, the green scanning lines Gg and the blue scanning lines Gb are simultaneously enabled such that grayscale voltage signals are applied on corresponding red subpixels 201, green subpixels 202 and blue subpixels 203 through data lines S1, . . . , Sm at the same time, and the liquid crystal display device 200 displays an inserted black frame.

The first control signal and the second control signal are appeared alternately such that the normal image frame and the inserted black frame are displayed alternately so that the cross talk problem in a 3D display or a serious image smear problem because of low refresh rate can be solved.

In the present embodiment, the reference voltage signal VCOM is a signal outputted from the driving chip 22. In another embodiment, the reference voltage signal VCOM can also be a common voltage signal applied on a common electrode (not shown) of the liquid crystal display device 200.

The liquid crystal display device 200 in the above embodiment is a small size liquid crystal display device that is applied at a small size cell phone or a portable android device (PAD).

Figure 5:
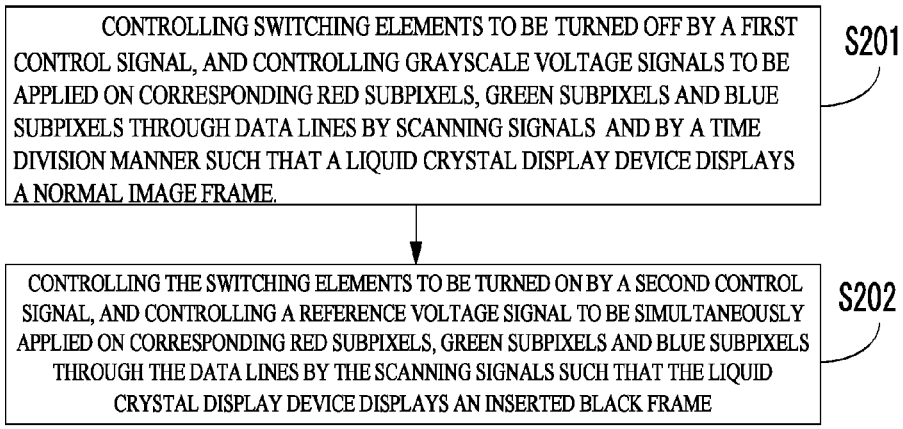
FIG. 5 is a flow chart of a control method for the liquid crystal display device shown in FIG. 4.

FIG. 5 is a flow chart of a control method for the liquid crystal display shown in FIG. 4. As shown in FIG. 5, the method includes the following steps:

Step S201: controlling switching elements to be turned off by a first control signal, and controlling grayscale voltage signals to be applied on corresponding red subpixels, green subpixels and blue subpixels through data lines by scanning signals and by a time division manner such that a liquid crystal display device displays a normal image frame.

In Step S201, when each switching element is an N-type MOS transistor, the first control signal is a low-voltage signal. The first control signal is applied on a first terminal of each switching element (that is, a gate of each N-type MOS transistor) such that a second terminal and a third terminal of each switching element are cutoff (turned off). That is, a source and a drain of each N-type MOS transistor are cut off (turned off). The scanning signals on the red scanning lines Gr, the green scanning lines Gg and the blue scanning lines Gb are enabled in a time division manner such that grayscale voltage signals outputted from the driving chip are applied on corresponding red subpixels, green subpixels and blue subpixels through data lines, and the liquid crystal display device displays a normal image frame.

A person skilled in the art can understand that in another embodiment, the switching element can be another switching element different from the N-type MOS transistor such as a NPN triode. As long as under the control of the control signal, the cutoff and conductive function can be realized.

Step S202: controlling the switching elements to be turned on by a second control signal, and controlling a reference voltage signal to be simultaneously applied on corresponding red subpixels, green subpixels and blue subpixels through the data lines by the scanning signals such that the liquid crystal display device displays an inserted black frame.

In Step S202, the second control signal is a high-voltage signal. The second control signal is applied on the first terminal of each switching element (that is, the gate of each N-type MOS transistor) such that the second terminal and the third terminal of each switching element are conductive. That is, the source and the drain of each N-type MOS transistor are conductive. At this time, the scanning signals on the red scanning lines, the green scanning lines and the blue scanning lines are simultaneously enabled such that the reference voltage signal is simultaneously applied on corresponding red subpixels, green subpixels and blue subpixels through data lines after passing through drains and sources of the N-type MOS transistors such that the liquid crystal display device displays an inserted black frame.

Step S201 and Step S202 are operated repeatedly such that the liquid crystal display device 200 alternately display a normal image frame and an inserted black frame.

Figure 6:
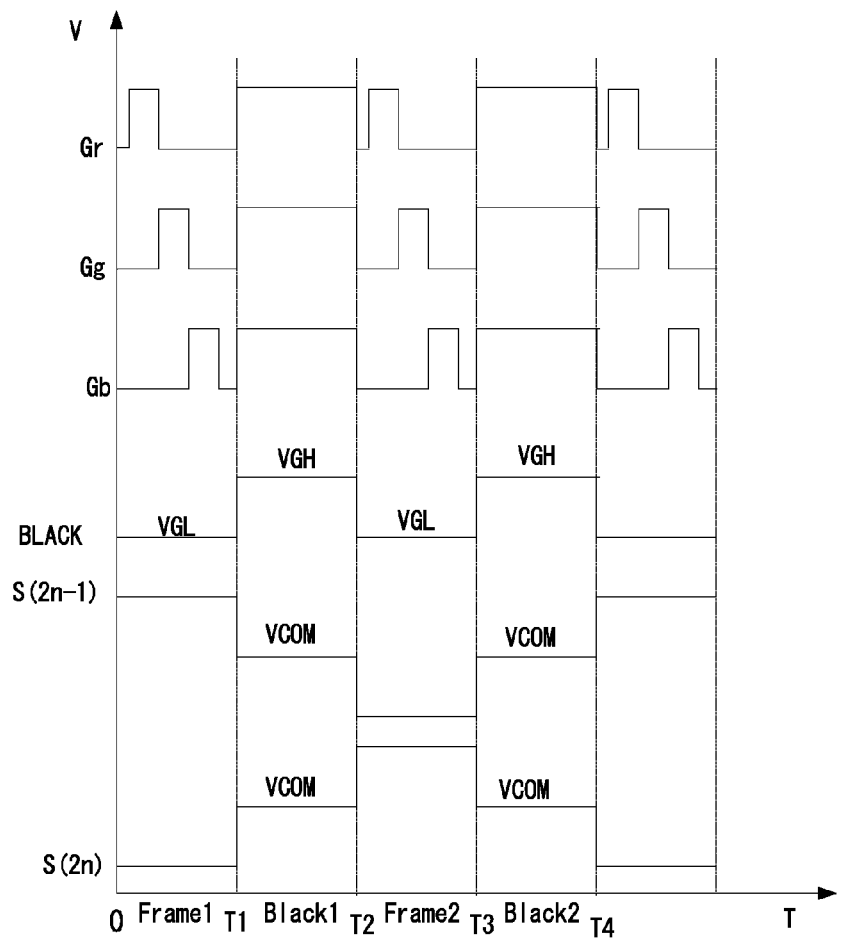
FIG. 6 is signal timing diagram of the control method for the liquid crystal display device shown in FIG. 5.

With reference to FIG. 6, FIG. 6 is signal timing diagram of the control method for the liquid crystal display device shown in FIG. 5. As shown in FIG. 6, a T-axis represents a time axis, and a V-axis represents a voltage axis, wherein 0 to T1 is a time interval for displaying a first image frame (Frame1), T1 to T2 is a time interval for displaying a first inserted image frame (Black1), T2 to T3 is a time interval for displaying a second image frame (Frame2), and T3 to T4 is a time interval for displaying a second inserted image frame (Black2).

Gr represents a timing of a scanning signal applied on a red scanning line, Gr represents a timing of a scanning signal applied on a green scanning line and Gb represents a timing of a scanning signal applied on a blue scanning line. BLACK represent a timing of a control signal applied on a first terminal of each switching element (that is, a gate of each N-type MOS transistor). S(2n−1) represents a timing of a signal applied on a (2n−1)-th data line. S(2n) represents a timing of a signal applied on a (2n)-th data line.

In a time interval of 0 to T1, the scanning signals applied on Gr, Gg and Gb are enabled in a time division manner. That is, the scanning signals applied on Gr, Gg, and Gb are high-voltage signals in a time division manner. Preferably, high-voltage hold-up times of scanning signals of Gr, Gg and Gb are the same. A first control signal applied on BLACK is a low-voltage signal VGL. S(2n−1) and S(2n) are applied with grayscale voltage signals, wherein polarities of the grayscale voltage signals applied on S(2n−1) and S(2n) are opposite. The liquid crystal display device 200 displays a first image frame.

In a time interval of T1 to T2, scanning signals applied on Gr, Gg and Gb are enabled simultaneously. That is, the scanning signals applied on Gr, Gg and Gb are high-voltage signals at the same time. A second control signal applied on BLACK is a high-voltage signal VGH. S(2n−1) and S(2n) are applied with a reference voltage signal VCOM. The liquid crystal display device 200 displays a first inserted black frame.

In a time interval of T2 to T3, scanning signals applied on Gr, Gg and Gb are enabled in a time division manner. A first control signal applied on BLACK is a low-voltage signal VGL. S(2n−1) and S(2n) are applied with grayscale voltage signals, wherein polarities of the grayscale voltage signals applied on S(2n−1) and S(2n) are opposite. The liquid crystal display device 200 displays a second image frame. Besides, on S(2n−1) or S(2n), a polarity of a grayscale voltage signal corresponding to the second image frame and a polarity of a grayscale voltage signal corresponding to the first image frame are opposite.

In a time interval of T3 to T4, scanning signals applied on Gr, Gg and Gb are enabled simultaneously. A second control signal applied on BLACK is a high-voltage signal VGH. S(2n−1) and S(2n) are applied with a reference voltage signal VCOM. The liquid crystal display device 200 displays a second inserted black frame.

Subsequent timings on Gr, Gg, Gb, BLACK, S(2n−1) and S(2n) are appeared repeatedly according to timings in the time interval 0 to T4 so that a normal image frame and an inserted black frame are alternately displayed on the liquid crystal display device 200.

Beneficial effects of the present invention are: in the liquid crystal display device and the control for the same, through controlling the switching elements to be turned off, grayscale voltage signals are applied on corresponding pixel units through data lines such that the liquid crystal display device displays a normal image frame. Through controlling the switching elements to be turned on, the reference voltage is applied on corresponding pixel units through data lines such that the liquid crystal display device displays the inserted black frame. Accordingly, a simple and power-saving way for an inserted black frame is realized to solve the cross talk in 3D display or a serious image smear problem in low refresh rate.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device, comprising:
   multiple data lines; multiple scanning lines;
   multiple pixel units, wherein each pixel unit is connected to a corresponding data line and a corresponding scanning line;
   multiple switching elements, wherein the multiple switching element are disposed in a non-display area of the liquid crystal display; and a driving chip connected with the multiple data lines, wherein the driving chip is operable to directly output grayscale voltage signals to the multiple data lines, output a reference voltage signal to the multiple data lines through the switching elements, and output a control signal to the switching elements, wherein each switching element has a first terminal, a second terminal and a third terminal; the first terminals of the switching elements are directly connected with each other for receiving the control signal outputted from the driving chip; the second terminals of the switching elements are directly connected with each other for receiving the reference voltage signal outputted from the driving chip; and the third terminal of each switching element is connected to a corresponding data line, wherein when the control signal is a first control signal, each of the switching elements is turned off such that the grayscale voltage signals are respectively applied on corresponding pixel units through the multiple data lines, and the liquid crystal display device displays a normal image frame; and when the control signal is a second control signal, each of the switching elements is turned on, the reference voltage signal is applied on the multiple pixel units through the multiple data lines, and the liquid crystal display device displays a inserted black frame, wherein each switching element is a N-type metal oxide semiconductor (MOS) transistor; the first terminal, the second terminal, and the third terminal of each switching element are respectively a gate, a drain and a source of the N-type MOS transistor, wherein the reference voltage signal is a common voltage signal applied on a common electrode of the liquid crystal display device, wherein each pixel unit includes a red subpixel, a green subpixel and a blue subpixel; each scanning line includes a red scanning line, a green scanning line and a blue scanning line; the red subpixel, the green subpixel and the blue subpixel are respectively connected with corresponding red scanning line, green scanning line and blue scanning line; the red subpixel, the green subpixel and the blue subpixel are connected with a same data line, and wherein when the control signal is a first control signal, scanning signals on the red scanning lines, the green scanning lines and the blue scanning lines are enabled in a time division manner such that grayscale voltage signals are applied on corresponding red subpixels, green subpixels and blue subpixels through data lines in a time division manner; when the control signal is a second control signal, scanning signals on the red scanning lines, the green scanning lines and the blue scanning lines are enabled simultaneously such that the reference voltage signal is simultaneously applied on the red subpixels, the green subpixels and the blue subpixels through the data lines.

2. The liquid crystal display device according to claim 1, wherein the first control signal is a low-voltage signal, the second control signal is a high-voltage signal, and the first control signal and the second control signal are appeared alternately.

3. The liquid crystal display device according to claim 1, wherein the liquid crystal display device further includes a timing controller, a printed circuit board and a flip-chip thin film; the first terminal of each switching element is connected with the timing controller through the flip-chip thin film and the printed circuit board for receiving the control signal outputted from the timing controller; the second terminal of each switching element is connected with the reference voltage signal in the flip-chip thin film.

4. A liquid crystal display device comprising:
multiple data lines; multiple scanning lines;
multiple pixel units, wherein each pixel unit is connected to a corresponding data line and a corresponding scanning line;
multiple switching elements, wherein the multiple switching element are disposed in a non-display area of the liquid crystal display; and
a driving chip connected with the multiple data lines, wherein the driving chip is operable to directly output grayscale voltage signals to the multiple data lines, output a reference voltage signal to the multiple data lines through the switching elements, and output a control signal to the switching elements, wherein each switching element has a first terminal, a second terminal and a third terminal; the first terminals of the switching elements are directly connected with each other for receiving the control signal outputted from the driving chip; the second terminals of the switching elements are directly connected with each other for receiving the reference voltage signal outputted from the driving chip; the third terminal of each switching element is connected to a corresponding data line, wherein when the control signal is a first control signal, each of the switching elements is turned off such that the grayscale voltage signals are respectively applied on corresponding pixel units through the multiple data lines, and the liquid crystal display device displays a normal image frame; when the control signal is a second control signal, each of the switching elements is turned on, the reference voltage signal is applied on the multiple pixel units through the multiple data lines, and the liquid crystal display device displays an inserted black frame, wherein each pixel unit includes a red subpixel, a green subpixel and a blue subpixel; each scanning line includes a red scanning line, a green scanning line and a blue scanning line; the red subpixel, the green subpixel and the blue subpixel are respectively connected with corresponding red scanning line, green scanning line and blue scanning line; the red subpixel, the green subpixel and the blue subpixel are connected with a same data line, and wherein when the control signal is a first control signal, scanning signals on the red scanning lines, the green scanning lines and the blue scanning lines are enabled in a time division manner such that grayscale voltage signals are applied on corresponding red subpixels, green subpixels and blue subpixels through data lines in a time division manner; when the control signal is a second control signal, scanning signals on the red scanning lines, the green scanning lines and the blue scanning lines are enabled simultaneously such that the reference voltage signal is simultaneously applied on the red subpixels, the green subpixels and the blue subpixels through the data lines.

5. The liquid crystal display device according to claim 4, wherein each switching element is a N-type metal oxide semiconductor (MOS) transistor; the first terminal, the second terminal and the third terminal of each switching element are respectively a gate, a drain and a source of the N-type MOS transistor.

6. The liquid crystal display device according to claim 5, wherein the first control signal is a low-voltage signal, the second control signal is a high-voltage signal, and the first control signal and the second control signal are appeared alternately.

7. The liquid crystal display device according to claim 4, wherein the liquid crystal display device further includes a timing controller, a printed circuit board and a flip-chip thin film; the first terminal of each switching element is connected with the timing controller through the flip-chip thin film and the printed circuit board for receiving the control signal outputted from the timing controller; the second terminal of each switching element is connected with the reference voltage signal in the flip-chip thin film.

8. The liquid crystal display device according to claim 4, wherein the reference voltage signal is a common voltage signal applied on a common electrode of the liquid crystal display device.

\* \* \* \* \*